United States Patent

DePaul

Patent Number: 5,707,515
Date of Patent: Jan. 13, 1998

[54] LUBRICATING OIL RECONDITIONING SYSTEM WITH ELECTRICALLY HEATED PLATEN

[76] Inventor: Michael T. DePaul, 41 Manchester Ct., Fox River Grove, Ill. 60021

[21] Appl. No.: 344,287

[22] Filed: Nov. 22, 1994

[51] Int. Cl.$^6$ ............ B01D 35/18; B01D 35/30
[52] U.S. Cl. ............ 210/180; 123/196 A; 184/6.22; 196/46.1; 210/184
[58] Field of Search .......... 123/196 A; 184/6.22, 184/6.24; 196/46.1, 115; 210/97, 149, 168, 171, 180, 187, 18, 232, 261, 262, 295, 323.1, 433.1, 741, 774, 790, 805, 806, 120, 184; 96/218, 219; 95/241, 251; 2319/205

[56] References Cited

U.S. PATENT DOCUMENTS

| | | | |
|---|---|---|---|
| 2,159,994 | 5/1939 | La Brecque | 196/46.1 |
| 2,161,964 | 6/1939 | La Brecque | 196/46.1 |
| 2,173,631 | 9/1939 | Niedens | 210/180 |
| 2,336,021 | 12/1943 | Labrecque | 210/180 |
| 2,425,377 | 8/1947 | La Brecque | 196/46.1 |
| 3,616,885 | 11/1971 | Priest | |
| 3,756,412 | 9/1973 | Barrow | 210/180 |
| 3,859,975 | 1/1975 | Hines | 123/196 A |
| 3,915,860 | 10/1975 | Priest | 210/136 |
| 4,006,084 | 2/1977 | Priest | 210/180 |
| 4,093,548 | 6/1978 | Sterkenburg et al. | 210/180 |
| 4,115,201 | 9/1978 | Malec | 196/46.1 |
| 4,146,475 | 3/1979 | Forsland | |
| 4,261,838 | 4/1981 | Halleron | 210/774 |
| 4,337,119 | 6/1982 | Donahue | 196/46.1 |
| 4,338,189 | 7/1982 | Johnson, Sr. | 210/180 |
| 4,349,438 | 9/1982 | Sims | 210/180 |
| 4,354,946 | 10/1982 | Warlick et al. | 210/774 |
| 4,369,110 | 1/1983 | Picek | 210/180 |
| 4,388,185 | 6/1983 | Ott et al. | 210/136 |
| 4,443,334 | 4/1984 | Shugarman et al. | 210/168 |
| 4,717,474 | 1/1988 | Sims | 210/180 |
| 4,758,338 | 7/1988 | Johnson, Sr. | 210/168 |
| 4,830,745 | 5/1989 | van der Meulen | 210/168 |
| 4,898,668 | 2/1990 | Hodgkins et al. | 210/180 |
| 4,933,093 | 6/1990 | Keller | 210/774 |
| 4,971,704 | 11/1990 | Johnson | 210/180 |
| 5,198,104 | 3/1993 | Menyhert | 210/149 |
| 5,211,856 | 5/1993 | Shen | 210/799 |
| 5,242,034 | 9/1993 | De Paul | 184/6.22 |

FOREIGN PATENT DOCUMENTS 295871  12/1988  European Pat. Off.

*Primary Examiner*—Joseph W. Drodge
*Attorney, Agent, or Firm*—Olson & Hierl, Ltd.

[57] ABSTRACT

Apparatus and methods for improved in-line contaminant removal from engine lubricating oil are provided which employ gravity to achieve a desired flow rate of oil. The invention is adapted for use with an existing engine oil lubrication system and continuously processes a side stream that after processing, is returned to the engine oil. During processing, the oil is first filtered and then drained and deposited upon the upper central surface portions of a heated dome whereon the oil forms a thin film from which relatively low boiling volatile impurities (especially water) are rapidly separated in a gaseous state. The gas is vented through a pressure relief valve to the manifold while the recovered reconditioned oil is collected and recycled.

5 Claims, 3 Drawing Sheets

LUBRICATING OIL RECONDITIONING SYSTEM WITH ELECTRICALLY HEATED PLATEN

FIELD OF THE INVENTION

This invention relates to an improved apparatus and methods adapted particularly for the continuous removal of contaminants from the lubricating oil of an operating fuel combusting engine.

BACKGROUND OF THE INVENTION

In fuel combusting engines, particularly those of the internal combustion type using a liquid fuel such as gasoline or diesel oil, it is known that filtering of the circulating lubricating oil does not remove liquid contaminants from the oil. These liquid contaminants substantially comprise relatively low boiling condensates, especially water, whose presence in the oil causes engine corrosion and wear.

Lubricating oil reconditioning systems that remove such liquid contaminants from circulating engine lubricating oil have previously been proposed for use in association with operating fuel combusting engines. Such prior art systems suffer from various disadvantages so that typically they are not energy-efficient, and not highly effective.

For example, in prior art, a filter subassembly is commonly located below a vaporization chamber in an oil heating device, thereby relying on pressure for the oil to enter the chamber. Thus, prior art devices inject oil under pressure into the chamber making it difficult if not impossible to achieve a sustained thin film for impurity vaporization purposes. Additionally, variations in oil pressure due to changes in engine rpm vary the amounts of oil that are input into the chamber further reducing the effectiveness of the device.

Menyhert U.S. Pat. No. 5,198,104, for example, discloses a device for removing volatile components from oil in which the oil is filtered before being subjected to a volatilization procedure using a heated plate with multiple protrusions. However, in such a device, the filter is positioned below the volatilization chamber so that oil accumulates in the filter and is wasted during a filter change.

In Menyhert, a cartridge-type heater is used which characteristically does not distribute heat evenly to the vaporizing surfaces. Also, such a heater must be partially exposed to the outside elements, thereby increasing the likelihood of heater failure due to shorts and corrosion.

Also, although Menyhert alleges that his "walls" maintain a thin film in conjunction with a swivel mount, since oil is fed under pressure into his chamber, it will spray and so the swivel mount is not effective for heavy duty use which requires strong stationary mounts. Also, his swivel mount places undue stresses on the inlet and outlet hoses and fittings. The only vaporizing surface in Menyhert is the centermost wall. The oil pools (collects) in the valleys of the concentric wall members and does not travel in a thin film. Since the oil enters under pressure, the oil, under increased pressure, sprays into the chamber and misses the first vaporizing wall surface. Menyhert cannot maintain a uniform thin oil layer during the volatilization procedure.

In addition, for Menyhert to achieve a correct seal between his oil inlet and filter, the filter and the evaporator plate, and the cap and the outer canister, great effort must be extended to adjust and readjust the tension on the clamps and adjustable threaded center post. This leads to the generally unacceptable result of oil leaking through the seals and not being processed completely.

For another example, in Engel U.S. Pat. No. 4,289,583, a heater post must contact the evaporator plate and transmit heat to the wall surfaces. This is a highly inefficient arrangement. Also, Engel '583 has the same spray introduction and uniform oil volatilization problems as Menyhert and other prior art heated plate pressure fed systems. The techniques taught for connecting and sealing the cap to the outer canister with bolts causes the bolt ears and castings to break under undue stress, thus causing major leaks.

So far as is now known, no one has previously developed a lubricating oil reconditioning system wherein the oil is first filtered and then passed as a thin film over a heated, generally dome-configured platen using gravity as a primary means for controlling oil flow.

SUMMARY OF THE INVENTION

This invention relates in one aspect to a new and very useful improved process for carrying out in-line contaminant removal, especially the continuous removal of relatively low boiling liquids, such as water, from an oil, particularly a lubricating oil in an operating fuel combusting engine.

By this process, a side stream comprising a minor fraction of a total stream of lubricating oil that is being pumped from the collecting zone of the engine oil pan and moved back to bearing surfaces is separated and charged to a contaminant removal zone. In the contaminant removal zone, the side stream is gravitationally filtered and then discharged onto the central region of a heated, generally dome-configured heat exchange surface or platen so that the filtrate spreads as a thin fluid film over such surface. Components of the oil film that have relatively low volatility, such as water, are vaporized and thereby separated therefrom. The resulting oil continuously moves downwards, is collected about the base of the surface, and is recirculated and admixed with the engine oil, preferably in the engine oil pan.

This invention further relates in another aspect to a new and very useful improved oil reconditioning apparatus for carrying out the inventive contaminant removal process.

This apparatus employs a filter subassembly that is positioned in superimposed relationship over a domeconfigured, electrically heated platen. A housing encloses upper surface portions of the platen and defines with the platen a vapor collecting chamber. A lubricating oil stream is first discharged into the filter and then moved downwards by gravity. Oil filtrate from the filter and subassembly flows upon the central portion of the domed platen, moves downwardly thereover as a thin film and collects in a circular basin around the platen base from which the collected oil is recirculated. Vapors collecting in the chamber are released through a relief valve when the chamber pressure rises above a preset value.

The dome-configured platen is preferably a spherical segment, more preferably a hemispherical shape, but other concavely curved configurations for the platen can be utilized if desired.

By positioning the filter subassembly over the platen, various advantages are achieved. For one advantage, filtered oil continuously drains by gravity from the filter subassembly and does not accumulate therein. Processed oil is promptly returnable to the lubricating oil. Also, during a filter change, oil within the filter subassembly is not lost and no time delay results such as would be needed to drain oil from the old filter for recycling and oil conservation purposes.

In a pressure system of the prior art, oil sprays into the evaporation chamber. Pressure changes in the engine rpm effect the ability to maintain a thin film and a constant flow rate. Gravity feed into a vaporization chamber, however, further assists in the separation of contaminant liquids from the oil. Gravity feed into the chamber through passageways above the chamber regulates the flow of oil into the chamber. Regardless of oil pressure changes, the flow into the chamber will remain constant. A thin film can be maintained. Thereby, vaporization of contaminants is more efficient.

For another advantage, the overhead filter subassembly accomplishes preparation of a freshly prepared filtered oil feed for charging to the hemispherical platen. A maximum amount of particulates, sludge and like separatable contaminants are thus removed from the oil undergoing reconditioning before that oil in the form of a thin film is subjected to flash heating. This enhances the ability to efficiently remove a maximum amount of low volatile contaminants, such as water, with a minimum amount of heat energy.

For still another advantage, the inventive apparatus permits the use of gravitational force to achieve the desired process flow pattern. Thereby, the amount of lubricating oil pumping capacity and pumping pressure required for a vehicular oil pump needed for use in utilizing the reconditioning system of this invention is reduced to a level comparable to that used for an oil pump in a conventional engine lubricating oil recirculation system.

For still another advantage, the inventive apparatus can be functionally associated with an existing engine with a minimum amount of equipment alteration and with a minimum amount of labor and without redesigning the oil lubricating system of the engine.

Prior art devices commonly utilize stepped surfaces in an attempt to maintain a thin film during periods when a device is tilted (such as occurs frequently in mobile applications). By regulating the flow of oil through a controlled gravity feed into a centermost portion of a dome, any tilt of the unit does not disrupt the thin film or the length of oil time on the evaporation surface.

The present invention makes possible a reduction in the number of seals needed that must be fitted and tightened properly at each maintenance interval. Typically, the prior art uses three seals while a device of this invention uses only one. Also, the possibility of user error in tightening various clamps and bolts to achieve a correct seal in the prior art has been eliminated.

In one presently preferred embodiment, of an apparatus of the invention, a filter subassembly is located over and is functionally associated with a vaporization chamber across whose lower position is located a domed heated platen.

In another presently preferred embodiment of the apparatus of this invention, a filter subassembly is located in separated but adjacent functionally interconnected relationship to a housing structure that incorporates a vaporization chamber across whose lower portion a domed heated platen is located.

It is a feature of the preferred embodiments of this invention that the domed platen structure incorporates a molded body preferably comprised of metal within which is incorporated an electrical heating element that is adapted when energized to uniformly heat the dome platen structure.

Another feature preferably associated with the foregoing molded domed platen structure is that it is also integrally molded in combination with bottom circumferentially adjoining portions and adjoining upstanding circumscribing side wall portions.

Other and further objects, aims, features, purposes, advantages, embodiments and the like will be apparent to those skilled in the art from the teachings of the present specification taken with the accompanying drawings and the appended claims.

DETAILED DESCRIPTION OF THE DRAWINGS

Figure 1:
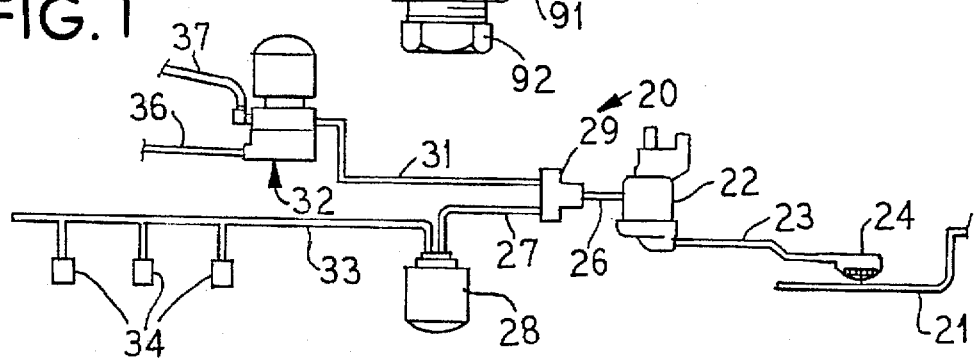
FIG. 1 is a fragmentary diagrammatic environmental view illustrating one embodiment of an oil reconditioning system of the present invention in functional association with the lubrication system of a fuel combusting engine.

Referring to FIG. 1, there is shown one presently preferred embodiment of an engine lubricating oil reconditioning system of the present invention, such system being generally designated by the numeral 20.

In system 20, lubricating oil that has drained and collected in a conventional engine oil pan 21 is withdrawn by conventional oil pump 22 via interconnecting conduit 23 through a conventional oil screen structure 24 located in oil pan 21. From pump 22, the oil is passed as a main lubricating oil stream successively through respective conduits 26 and 27 into a conventional replaceable oil filter 28 or the like.

In filter 28, oil under partial pump 22 pressure from conduit 27 is conventionally filtered to remove filterable contaminants, such as particulates and sludge; and the filtered oil passes into a conduit system 33 through which it is conveyed to engine bearings 34 for conventional lubrication purposes. From the bearings 34, the oil drains down (not detailed in FIG. 1) and is again collected in the oil pan 21 for recycling through pump 22.

Conduits 26 and 27 are connected together through a by-pass valve or proportional flow divider 29 which divides the oil entering from conduit 26 into two streams, a main oil stream comprising more than 50 volume percent of the oil that enters and flows through conduit 27 and a side oil stream comprising the remaining volume percent of the oil. The side stream enters and flows through conduit 31 to an embodiment of oil the reconditioning apparatus of this invention, such embodiment being generally designated by the numeral 32.

From conduit 31, the side oil stream under partial pressure generated by pump 22 enters into oil reconditioning apparatus 32 and is processed as described herein to separate filterable contaminants as well as low boiling contaminants from the oil. The resulting processed and reconditioned oil exits from apparatus 32 through interconnecting conduit 36 and preferably passes (route not specifically detailed in FIG. 1) into oil pan 21 or the like for recycling and reuse in engine lubrication. The volatiles separated from the oil in apparatus 32 are discharged from apparatus 32 into conduit 37 and are preferably conveyed to the engine intake manifold (not detailed) or the like.

The system 20 is well suited for installation in combination with a previously manufactured vehicular engine or the like using a kit or the equivalent. Such a kit can comprise, for example, the proportional flow divider 29, the oil reconditioning apparatus 32 and the interconnecting conduit components 31. Observe that, in the system 20 there are essentially two lubricating oil reconditioning systems, one system involving the main oil stream that is charged to conduit 27 in which the filter 28 is used for oil processing, and the second system involving the side oil stream that is charged to conduit 31 in which the apparatus 32 is used for oil processing. It is a feature of the system 20 that it can be functionally associated with a vehicular engine without redesigning the originally installed lubricating oil system. Thus, usually even the originally installed lubricating oil pump (which is commonly located in the oil pan) can be used in the system 20.

Those skilled in the art will readily also appreciate that, particularly in the case of relatively small vehicular engines, the apparatus 32 can be employed as a replacement or alternative for a conventional oil filter subassembly, such as the replaceable oil filter 28 or the like.

Figure 4:
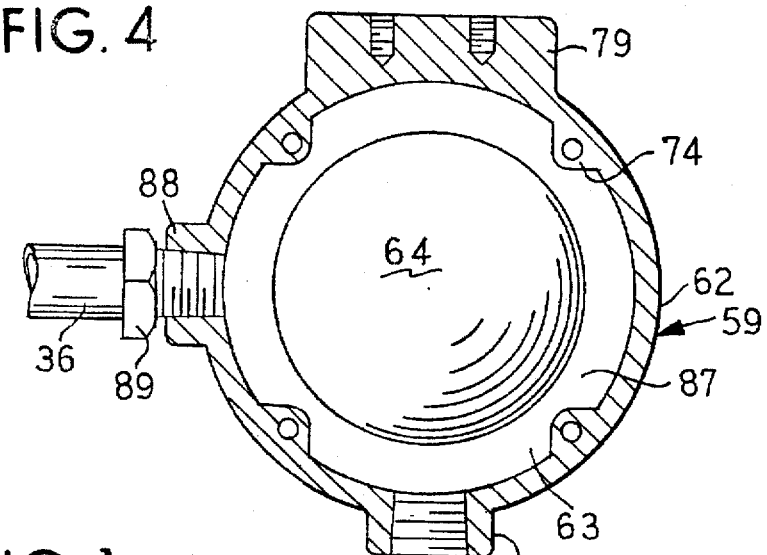
FIG. 4 is a horizontal sectional view taken generally along the line IV—IV of the apparatus shown in FIG. 3.
Figure 2:
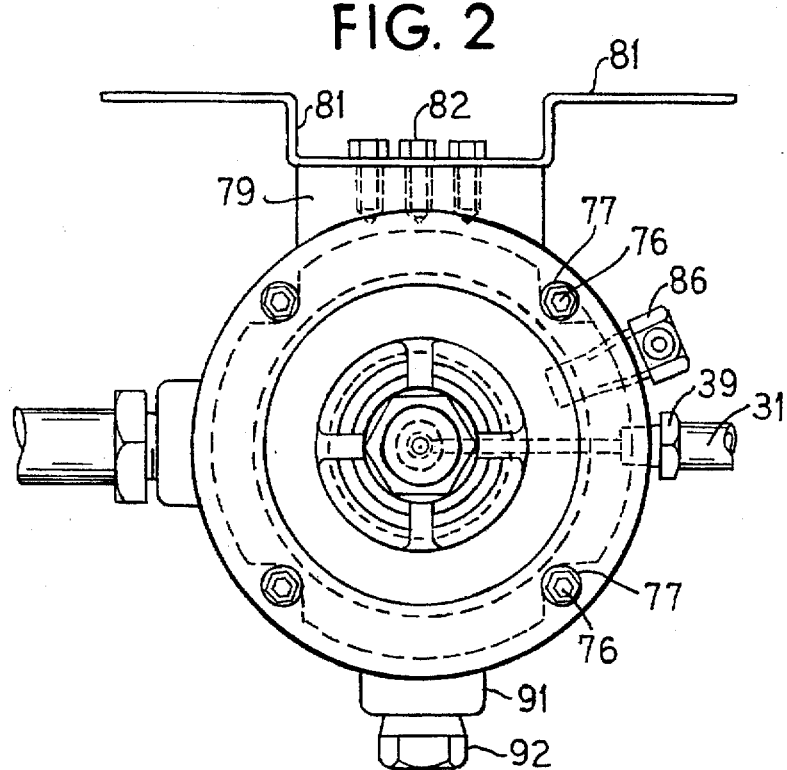
FIG. 2 is an enlarged plan view of the oil reconditioning apparatus employed in the oil reconditioning system of FIG. 1 with the oil filter subassembly being shown in phantom.
Figure 3:
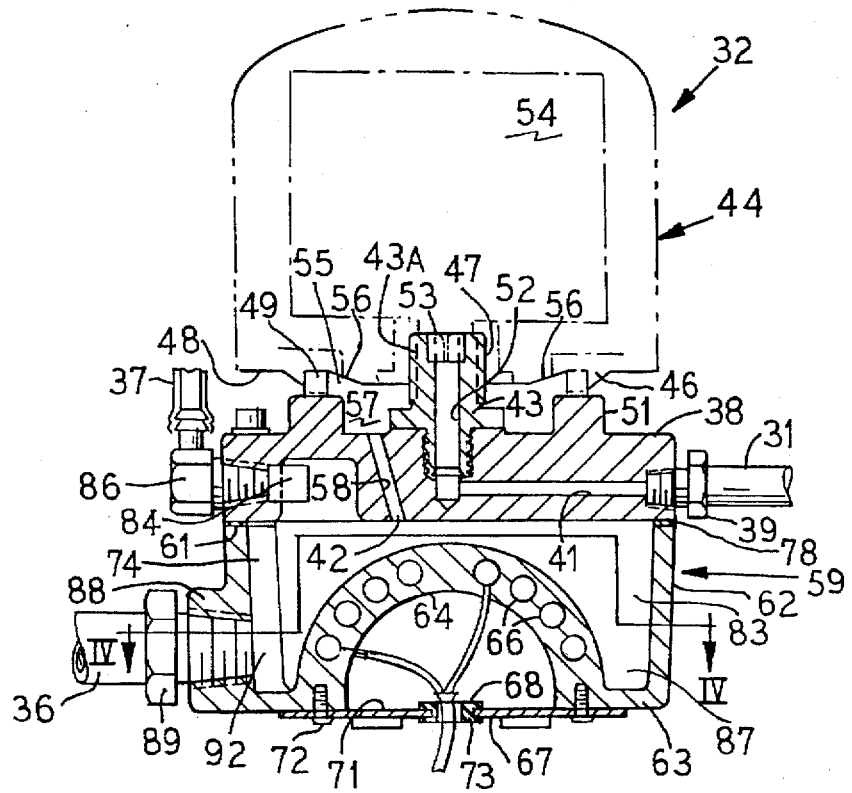
FIG. 3 is a vertical sectional view of the apparatus shown in FIG. 2 taken generally axially, but showing the oil filter subassembly in phantom and showing the vapor release valve in a circumferentially displaced location relative to the oil input location for convenient representation and disclosure purposes.

Referring to FIGS. 2–4, the structure and operation of apparatus 32 is shown. Conduit 31 is connected to a circular, flattened cap block or plate 38 (see, for example, FIG. 3) that is itself conveniently comprised of a body of cast and machined metal. The connection being accomplished by means of a threadably joined conventional compression fitting 39 or the like. In block 38, the oil entering from conduit 31 passes generally radially in a channel 41 and enters an axial passage 42. Threadably connected to passage 42 is a threaded stud 43 with chambered opposite ends. The upstanding circumferential outer surfaces 43A of stud 43 are threaded and adapted to be matingly threadably engaged with the threaded axial input orifice 47 (not detailed but shown in phantom) of a conventional canister-type replaceable oil filter subassembly 44 (not detailed but shown in phantom).

This filter works oppositely from most auto filters because, in this filter, oil flows from the inside out instead of outside in. (Most standard auto filters have a "check valve" that will not allow inside out flow.)

In addition, the face plate 48 of filter 44 is provided with a conventional gasket-retaining shoulder 46 that outstands circumferentially in the face plate 48 in radially spaced relationship to the orifice 47, and a square section gasket ring 49 or the like is seated inwardly adjacent to shoulder 46 on face plate 48. The upper surface of block 38 is provided with an upstanding circular shoulder 51 that extends in radially spaced relationship to the passage 42 and whose outside upper surface is flattened. When filter 44 is threadably connected to stud 43, gasket ring 49 sealingly seats against the shoulder 51.

Stud 43 is provided with an axial bore 52 whose outer end is optionally but preferably fitted with an inset metering jet 53. Thus, pressurized oil from passage 42 enters bore 52 and is discharged (preferably sprayed) into the filter 44.

After passing through the filter medium 54 (not detailed, but shown in phantom) in filter 44, the filtered oil flows by gravity downwards, exits the filter 44 through its exit ports 56, passes through a cavity 55 and deposits upon and in a shallow, flat bottomed well 57 defined in the top of block 38 between stud 43 and shoulder 51. A plurality of circumferentially spaced, diagonally downwardly and inwardly extending channels 58 (four are shown for illustrative purposes) extend from the bottom of well 57 through the block 38. The channels 58 are thus adapted for the passage of oil therethrough by gravity from well 57.

The peripheral bottom facial surface regions of the block 38 are flattened and adapted for face-to-face engagement with the upper, circumferentially extending rim edge 61 of a housing 59 that is itself conveniently comprised of a body of cast and machined metal. Housing 59 is shown preferably as a one-piece structure having in axial vertical section a generally W-shaped configuration. The outside wall 62 of housing 59 upwardly extends circumferentially and terminates in the rim edge 61. Between, and joined to, the bottom regions of wall 62 at a cross-over region 63 is a hemispherically shaped thickened dome 64. Within the dome 64 is cast a conventional type of spirally extending, electrically energizable, electrically insulated, resistance heated wirelike conductor or heater 66.

Mounted across the bottom opening mouth 71 of the dome 64 by means of button head cap screws 72 or the like that are threadably received in the adjacent portions of the dome 64 is a flattened cover plate 67. A center hole 73 in plate 67 is conveniently provided with a conventional army-navy type rubber grommet 68. Through the center hole of the grommet 68 lead wires 69 interconnect with respective opposite ends of the spirally extending heater 66. When the apparatus 32 is being employed with a vehicular engine, the heater 66 can be selected so as to be operated by a 12-volt energy source (such as a conventional vehicular battery) with the wattage being determined by such variables as the type of heater 66 employed, the type of temperature control utilized and the like. Various types of conventional temperature control means can be used with a present preference being a temperature switch attached to the bottom surface of dome 64. The switch cuts the current to the heater at a predetermined upper limit and thereafter cycles the heater on and off to maintain the desired vaporization heat. The operating temperature for the heater 66 can be as desired. However, a present preference for use with the apparatus 32 when associated with a conventional internal combustion engine is about 190° F.

To connect the housing 59 with the block 38, a plurality of (for example, four) circumferentially spaced, transverse bores (not detailed) are provided about the perimeter of plate 59 which are each aligned with a plurality of corresponding circumferentially spaced, thickened wall portions 74 in the housing wall 62. A cap screw 76 with an associated lock washer 77, or the like extends through each plate 38 bore and is threadably received in a mating bore (not detailed) in each thickened wall portion 74. To achieve a seal between the block 38 and the housing 59, a flat gasket 78 is interposed therebetween.

To mount the apparatus 32 to a surface, such as a vehicular firewall or the like (not detailed), the housing wall 62 is provided with a side projection 79 to which is affixed a mounting bracket 81 that is held to the projection 79 by means of hex-headed bolts 82 or the like.

In operation, freshly filtered oil (not shown) from filter 44 drains by gravity down through the channels 58, deposits upon the central upper outer surface region of the heated dome 64, spreads and forms a thin film upon the heated surface of the dome 64. Volatiles, such as water, are rapidly boiled away or flashed from the oil film and enter into the gas space of the chamber 83 that is defined by the walls 62, the dome 64 and the plate 38. When the gas (vapor) pressure in the chamber 83 reaches some predetermined value, a normally closed pressure relief valve 84 or the like automatically opens, thereby relieving the pressure in the chamber 83. When the pressure within chamber 83 drops to some predetermined lower value, the relief valve 84 automatically closes, thereby returning the chamber 83 to its normally isolated state.

The relief valve 84 is functionally connected to the conduit 37 using a compression fitting 86 or the like which, as indicated above, is in turn connected to the engine intake manifold (not shown). Thus, vapors released from the chamber 83 are not released directly to the atmosphere, but are injected into the heated manifold where combustion (oxidation) of combustible (oxidizable) components in the released vapors can occur (as is desirable for pollution control and abatement purposes).

The oil on and from the surface of the dome 64 flows downwards by gravity and collects in a flat bottomed sump 87 between the bottom regions of wall 62 and dome 64 over cross-over region 63. Oil in sump 87 is withdrawn through conduit 36 which is threadably connected though a thickened portion 88 in wall 62 by means of a threaded compression fitting 89.

The housing 59 is also preferably provided with another thickened portion 91 that is provided with a threaded aperture (not detailed) which is fitted with a threadably engaging plug 92. For purposes of optionally changing the location of fitting 89 and conduit 36 for purposes of achieving a most direct routing back to the oil pan in a particular application of apparatus 32.

While the dome 64 (as shown) is preferably generally hemispherical in configuration, those skilled in the art will appreciate that other spherical segment configurations can be employed for the dome 64 (such as parabolic shapes, elliptical shapes, conical shapes and the like) and also that, broadly, any convexly curved or vertically up-raised upper surface can be employed in the dome 64. The filtered oil is preferably deposited in the region of maximum upward projection of the dome 64 upper surface so that the flow path downwards of the oil comprising the thin film on the dome upper surface is of maximum length for achieving the preferred heat exposure to a thin film.

Both the heating of the dome and the rate of oil film flow over the dome surface should preferably be uniform with relatively "hot" or "cold" spots on the dome being avoided and with dome localized surface irregularities being avoided which could cause localized variations in oil film flow rate (and oil exposure time).

While some residual pressurization of oil being processed in apparatus 32 is maintained during residence of oil in apparatus 32, the force of gravity in accomplishing the desired oil flow characteristics plays an important role in the operation of apparatus 32.

In normal operation, the oil pressure existing in, for example, the conduits 33 and 31 of system 20 is predictable and has a reliable value (over a set range) since the oil pump 22 of a given engine operates at about a constant pressure by engineering design. Also, in normal operation of a given engine, the pressure existing in the manifold falls within a predictable range, the exact pressure at any given instant being dependent upon such operating variables as engine rpm (revolutions per minute) engine load, rate and extent of fuel consumption, engine operating temperature and the like. Typically, the bulk average temperature of the oil in an operating interval combustion engine is below 212° F. (100° C.) At atmospheric environmental conditions. Thus, the flow rate of oil through apparatus 32 can be adjusted by a proportional flow divider 29 so that, during normal operating conditions, the oil level in sump 87 is sufficient to cover the aperture 92 leading to the conduit 36. Thereby, an operating condition is avoided in which this oil level is below the top of aperture 92 so that gas in chamber 83 can vent through conduit 36.

Typically, in normal operation, the release gas pressure for valve 84 is set to be substantially above the oil fluid pressure normally existing in conduit 31. Thus, liquid oil is vented into line 36 from sump 87 at any given time by a resultant combined pressure comprised of pressure in conduit 31, gravitational force and gas pressure in chamber 83. The release pressure for valve 84 is preferably chosen so as to be above the average manifold pressure so that, when valve 84 is open, manifold gases do not vent through conduit 37 back into chamber 83. The gas pressure in chamber 83 thus aids in recirculating oil from apparatus 32.

Figure 8:
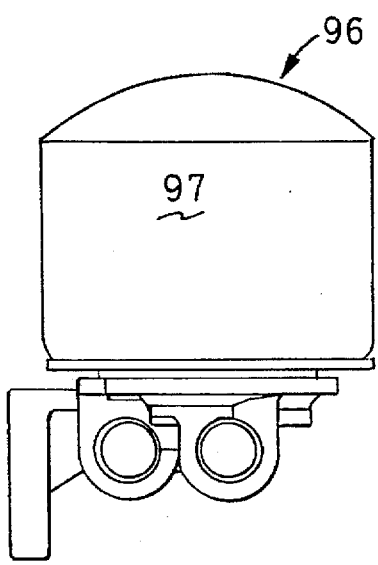
FIG. 8 is an end elevational view of the alternative filter subassembly shown in FIG. 7.
Figure 7:
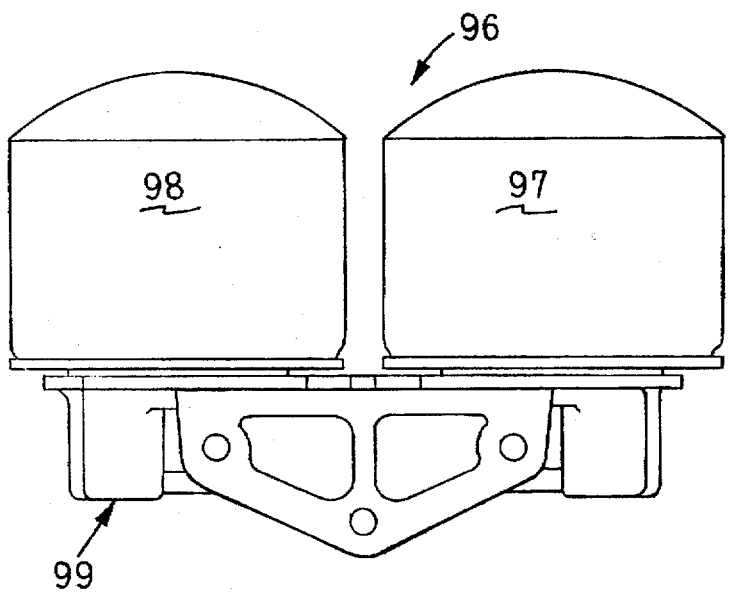
FIG. 7 is a side elevational view of an alternative filter subassembly for association with the embodiment of FIG. 5; and the apparatus of FIG. 6.
Figure 6:
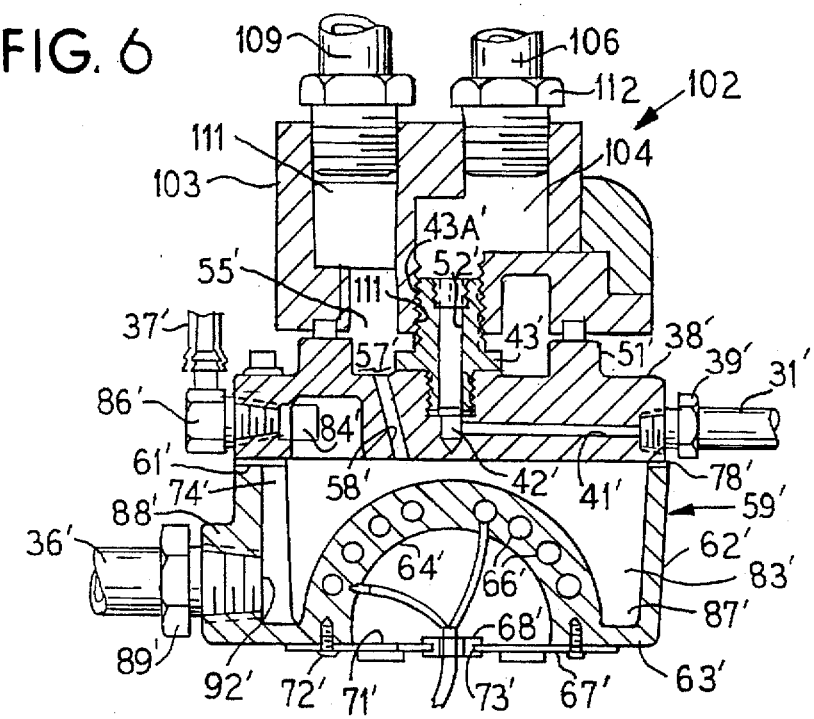
FIG. 6 is a vertical sectional view similar to FIG. 3, but showing the dome platen and its associated housing in further association with an alternative head plate, the resulting apparatus combination being adapted for use in the system embodiment of FIG. 5.
Figure 5:
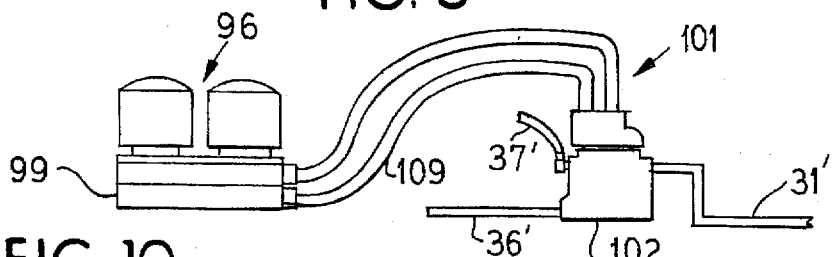
FIG. 5 is a view similar to FIG. 1 but showing an alternative embodiment of an oil reconditioning system of the present invention shown in fragmentary functional association with the lubrication system of a fuel combusting engine.

For purposes of enhancing the filtering of oil prior to the thin film flashing on the dome, particularly when the lubricating oil of a relatively large size engine is being reconditioned in accord with the present invention, filter subassemblies of large filtering capacity are preferred. For example, in the oil reconditioning apparatus 32, the single oil filter 44 can be replaced by a subassembly 96 such as shown in FIGS. 7 and 8 that incorporates a pair of oil filters 97 and 98 (also conveniently both being of the same structure as the replaceable spin-on, canister-type filter 44). The subassembly 96 is incorporated into an alternative system such as shown in FIG. 5 that is designated by the numeral 101 which utilizes the alternative apparatus such as shown in FIG. 6 that is designated by the number 102. Components in FIGS. 5 and 6 that correspond to components in FIGS. 1–4 are similarly numbered but with the addition of prime marks thereto for convenient identification purposes.

In system 101, lubricating oil that has drained and collected as in FIG. 1 in a conventional engine oil pan (not shown) is withdrawn by conventional oil pump (not shown) and enters interconnecting conduit 31' as shown in FIG. 1.

Oil in conduit 31' is delivered to apparatus 102 as shown in FIG. 5. Apparatus 102 is here generally the same as shown in FIG. 3 but is further associated with a cooperating adapter plate 103.

Oil in conduit 31' enters plate (or block) 38', as shown in FIG. 5, passes through channel 41' through bore 52' and into channel 104 in plate 103.

The lower face of plate 103 is threadedly associated at aperture 111 with outer circumferential threads 43A' of stud 43'. A compression fitting 112 threadably engages plate 103 at the mouth of bore 104 so than an associated conduit 106 receives the entering oil from conduit 31' and conveys this oil to filter subassembly 96. The base of subassembly 96 comprises a manifold structure 99 that is preferably comprised of cast and machined metal. In manifold structure 99, channel means is provided by which the input oil from conduit 106 is fed in separate streams to the filters 97 and 98. One such stream is fed through each of respective two threaded studs 107 and 108 upstanding from manifold structure 99 into the filter 97 and 98 that is associated therewith. Oil entering each filter 97 and 98 is filtered and then drains down from each filter first into a collection sumps 113 that are similar in function to sump 87. From each such sump, the filtered oil is collected and enters into return conduit 109 through which the filtered oil is returned to the mouth of the input bore 111 of plate 103. Conduit 109 is here threadably connected to the mouth of bore 111 by a compression fitting 114. In bore 111, the filtered input oil drains down through the channels 58' onto the central region of heated dome 64' thereby forming a thin film of oil from which volatiles are separated.

The manifold structure 99 is formed with an integral bracket structure 112 which enables the assembled oil filter subassembly 96 to be mounted to a firewall or the like in a vehicle (not shown) adjacent to the apparatus 102.

Figure 10:
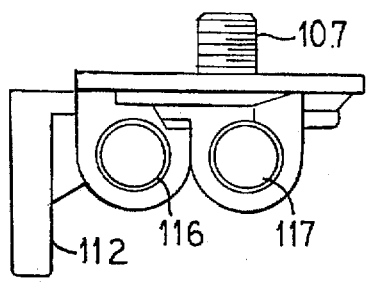
FIG. 10 is a view similar to FIG. 8 but with both of the canister-type filters removed.
Figure 9:
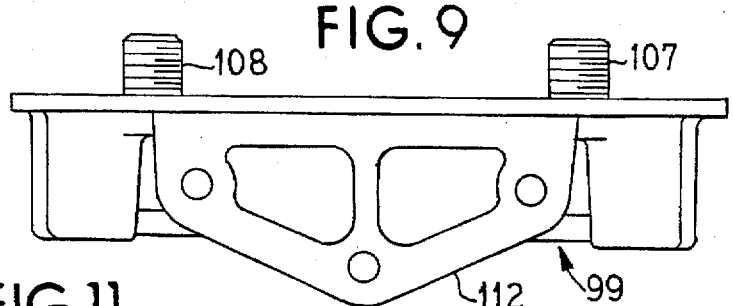
FIG. 9 is a view similar to FIG. 7, but with both of the canister-type filters removed.
Figure 11:
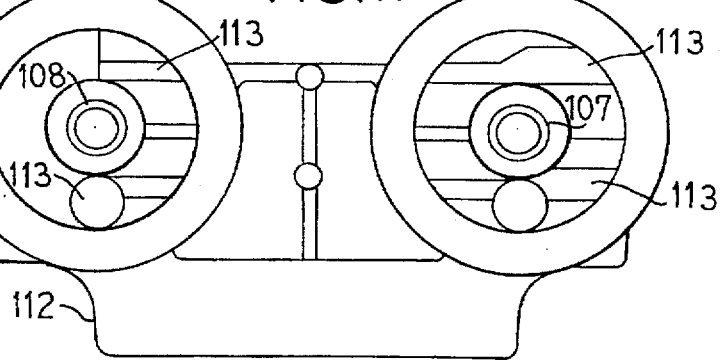
FIG. 11 is a top plan view of the structure shown in FIG. 9.

For ease in use, each opposing end of the manifold 99 is provided with an input port 116 and an output port 117 (see FIG. 10) for ease of use in connecting manifold 99 with conduits 106 and 109. Only one pair of ports 116 and 117 is used in a given installation with each of the non-used ports being closed by a threaded plug (not detailed).

Other and further variations will be apparent to those skilled in the art without departing from the spirit and scope of this invention.

What is claimed is:

1. A lubricating oil reconditioning apparatus comprising in combination:
    a dome configured platen means having associated electrically actuated resistance heating means for heating said platen means;
    a housing structure which generally encloses said platen means and defines in cooperation therewith a chamber that overlies said platen means;
    said housing structure including cooperative interengaging means for passage of filtered oil from an input orifice defined into an upper portion of said housing structure into said housing structure for oil flow upon and over a portion of said platen means as a thin film with said platen means being heated so that gas produced from said thin film enters said chamber while oil that drains from said platen means is collected at a lower region of said chamber; and
    said housing structure further including associated first conduit means for receiving said collected oil and associated second conduit means for receiving said gas from said chamber;
    said housing structure having a top portion that includes both an upstanding central stud means which is axially apertured and that is threaded on at least terminal portions of outer circumferential regions, that as a circumferentially extending upraised ridge means located in radially spaced relationship to said stud means and that has a generally flattened outer surface portion;
    said stud means being threadably engagable with a threaded aperture means defined in a cooperating plate member, said cooperating plate member additionally having defined therein a circumferentially extending gasket supporting region and an associated gasket means,
    said gasket supporting region being in radially spaced relationship to said threaded aperture means with said gasket means being sealingly engagable with said flattened outer surface portion when said cooperating plate member is so engaged with said stud means.

2. The apparatus of claim 1 wherein said flattened plate member comprises the face plate of at least one spin-on, canister-type oil filter that is so engaged, thereby to comprise a filter subassembly.

3. The apparatus of claim 2 wherein said cooperating plate member is thickened and has defined therein two channel means, one said channel means communicating with said apertured stud means and extending through said cooperating plate member to a first port therein whereby oil input through said input orifice passes from said input orifice to said first port, and the second said channel means extending from within said housing to a second port in said cooperating plate member whereby filtered oil passes from said second port through said housing to said dome configured platen means.

4. The apparatus of claim 3 wherein said filter subassembly is so operably associated with said housing structure through said cooperating plate member, with first conduit means extending in functional association between said first port and said input orifice of said filter subassembly, and second conduit means extending in functional association between said second port and said output orifice of said filter subassembly.

5. The apparatus of claim 4 wherein said filter subassembly includes a pair of spin-on canister type oil filters and an associated manifold structure wherein input oil from said cooperating plate member is delivered to both said filters through said first conduit means and filtered oil from both said filters is conveyed to said cooperating plate member through said second conduit means.

* * * * *